US009422189B2

(12) United States Patent
Walp

(10) Patent No.: US 9,422,189 B2
(45) Date of Patent: *Aug. 23, 2016

(54) SUBSTRATES OR ASSEMBLIES HAVING DIRECTLY LASER-FUSED FRITS, AND/OR METHOD OF MAKING THE SAME

(75) Inventor: Matthew S. Walp, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 623 days.

This patent is subject to a terminal disclaimer.

(21) Appl. No.: 12/929,741

(22) Filed: Feb. 11, 2011

(65) Prior Publication Data
US 2012/0207952 A1 Aug. 16, 2012

(51) Int. Cl.
B05D 3/06 (2006.01)
C03C 17/04 (2006.01)
(Continued)

(52) U.S. Cl.
CPC ........... *C03C 17/04* (2013.01); *B23K 26/0006* (2013.01); *B23K 26/0063* (2013.01);
(Continued)

(58) Field of Classification Search
CPC ....... C03C 17/04; C03C 17/06; C03C 17/09; C03C 17/23; C03C 17/245; C03C 17/2453; C03C 17/2456; C03C 17/34; C03C 17/3411; C03C 17/3417; C03C 17/3423; C03C 17/3429; C03C 17/36; C03C 17/3602; C03C 17/3607; C03C 17/3618; C03C 17/3639; C03C 17/3642; C03C 17/3644; C03C 17/3647; C03C 17/3657; C03C 17/366; C03C 2217/70; C03C 2217/72; Y10T 428/24851; Y10T 428/24876; B23K 26/0057; B23K 26/0063; B23K 26/0081; B23K 26/009; B23K 26/324; B23K 26/3266; B23K 26/3273; B23K 26/3293; B23K 26/34; B23K 35/365; B23K 26/0051; B23K 26/0084; B23K 26/0087
USPC ............. 427/554–559, 162–169, 375–376.3, 427/397.7, 397.8
See application file for complete search history.

(56) References Cited

U.S. PATENT DOCUMENTS 4,703,328 A * 10/1987 Jones ................... H01Q 1/1278
219/203
4,958,560 A * 9/1990 Collins ..................... B41C 1/14
101/128.21
(Continued)

FOREIGN PATENT DOCUMENTS

EP 0 377 444 7/1990
EP 1 020 765 7/2000
(Continued)

OTHER PUBLICATIONS

International Search Report dated Jun. 26, 2012.
(Continued)

*Primary Examiner* — Marianne L Padgett
(74) *Attorney, Agent, or Firm* — Nixon & Vanderhye P.C.

(57) ABSTRACT

Certain example embodiments relate to substrates or assemblies having laser-fused fits, and/or methods of making the same. In certain example embodiments, a pattern is formed or written on a stock glass sheet by laser fusing frit material to the glass sheet. An optional thin film coating is disposed on and supported by the stock glass sheet. The stock glass sheet with the pattern and the optional thin film coating is cut prior to heat treatment (e.g., heat strengthening and/or thermal tempering). A YAG or other type of laser source may be used to directly or indirectly heat the frit material, which may be wet applied to the substrate. In certain instances, the laser firing of the frit raises the temperature of the glass substrate to no more than 100 degrees C. and, preferably, the temperature is kept even lower.

10 Claims, 4 Drawing Sheets

(51) Int. Cl.
- *B23K 26/32* (2014.01)
- *B23K 26/34* (2014.01)
- *B23K 35/365* (2006.01)
- *B23K 26/00* (2014.01)
- *C03C 17/34* (2006.01)
- *B44C 1/00* (2006.01)

(52) U.S. Cl.
CPC ......... *B23K26/0084* (2013.01); *B23K 26/324* (2013.01); *B23K 26/3273* (2013.01); *B23K 26/3293* (2013.01); *B23K 26/34* (2013.01); *B23K 35/365* (2013.01); *B44C 1/00* (2013.01); *C03C 17/34* (2013.01); *B23K 2201/34* (2013.01); *C03C 2217/72* (2013.01); *Y10T 29/49885* (2015.01); *Y10T 428/24851* (2015.01)

(56) References Cited

U.S. PATENT DOCUMENTS

| | | | |
|---|---|---|---|
| 5,028,759 A * | 7/1991 | Finley | 219/203 |
| 5,242,560 A * | 9/1993 | Lingle et al. | 204/192.27 |
| 5,341,157 A | 8/1994 | Campagna et al. | |
| 5,421,256 A | 6/1995 | Cutcher | |
| 5,520,996 A * | 5/1996 | Balian et al. | 428/216 |
| 6,075,223 A * | 6/2000 | Harrison | 219/121.85 |
| 6,238,847 B1 | 5/2001 | Axtell, III et al. | |
| 6,373,618 B1 * | 4/2002 | Agrawal et al. | 359/265 |
| 6,598,426 B2 * | 7/2003 | Vandal et al. | 65/105 |
| 6,635,846 B1 | 10/2003 | Rieck | |
| 6,650,470 B1 | 11/2003 | Turner et al. | |
| 6,701,749 B2 * | 3/2004 | Wang et al. | 65/41 |
| 6,834,583 B1 | 12/2004 | Miller et al. | |
| 7,081,302 B2 * | 7/2006 | Lemmer et al. | 428/428 |
| 7,138,182 B2 | 11/2006 | Krisko et al. | 428/433 |
| 7,150,849 B2 * | 12/2006 | Veerasamy | 264/603 |
| 7,204,884 B2 * | 4/2007 | Lunsford et al. | 118/641 |
| 7,238,396 B2 | 7/2007 | Rieck | |
| 7,329,433 B2 * | 2/2008 | O'Shaughnessy et al. | 427/162 |
| 7,413,768 B2 * | 8/2008 | O'Shaughnessy | 427/162 |
| 7,604,736 B2 | 10/2009 | Medley | |
| 7,652,305 B2 | 1/2010 | Chatterjee et al. | |
| 7,858,191 B2 | 12/2010 | Lemmer et al. | |
| 7,892,604 B2 | 2/2011 | Veerasamy | |
| 7,892,662 B2 | 2/2011 | Veerasamy et al. | |
| 8,815,059 B2 * | 8/2014 | McLean | C03C 17/3435 204/192.1 |
| 9,150,449 B2 * | 10/2015 | Theios | C03C 17/3411 |
| 2003/0012891 A1 | 1/2003 | Hory et al. | |
| 2003/0116551 A1 * | 6/2003 | Sol | B32B 17/10036 219/203 |
| 2005/0084718 A1 * | 4/2005 | Tomonaga | C03C 17/007 428/698 |
| 2005/0155695 A1 * | 7/2005 | O'Shaughnessy et al. | 156/99 |
| 2006/0112729 A1 | 6/2006 | Sakoske | |
| 2008/0145661 A1 * | 6/2008 | Medwick et al. | 428/409 |
| 2009/0075069 A1 * | 3/2009 | Myli et al. | 428/336 |
| 2009/0233513 A1 | 9/2009 | Lee et al. | |
| 2011/0212311 A1 * | 9/2011 | Lemmer et al. | 428/212 |
| 2011/0223415 A1 * | 9/2011 | Drescher et al. | 428/336 |
| 2012/0328803 A1 * | 12/2012 | Theios | 428/34 |
| 2014/0216645 A1 * | 8/2014 | Nakamura | B32B 37/1292 156/272.8 |
| 2014/0370208 A1 * | 12/2014 | Walp | C03C 17/04 428/34 |
| 2014/0370209 A1 * | 12/2014 | Walp | E06B 3/6604 428/34 |
| 2015/0376935 A1 * | 12/2015 | Greiner | E06B 3/66304 428/34 |
| 2016/0009592 A1 * | 1/2016 | Arslan | B23K 26/0084 428/209 |

FOREIGN PATENT DOCUMENTS

| | | | |
|---|---|---|---|
| EP | 1 040 017 | 8/2008 | |
| WO | WO 99/29519 | 6/1999 | |
| WO | WO 2006/051238 | 5/2006 | |
| WO | WO 2007/067384 | 6/2007 | |
| WO | WO 2009/149889 A1 * | 12/2009 | C23C 14/16 |
| WO | WO 2010/115558 | 10/2010 | |

OTHER PUBLICATIONS

U.S. Appl. No. 12/926,714, filed Feb. 26, 2010; Lemmer et al.
U.S. Appl. No. 12/923,082, filed Aug. 31, 2010; McLean et al.
U.S. Appl. No. 12/662,894, filed May 10, 2010; Lemmer et al.
U.S. Appl. No. 12/659,196, filed Feb. 26, 2010; Lemmer et al.
U.S. Appl. No. 12/385,234, filed Feb. 27, 2004; Lemmer et al.
U.S. Appl. No. 12/385,802, filed Jan. 19, 2005; Lu et al.
U.S. Appl. No. 12/461,792, filed Sep. 18, 2006; Blacker et al.
U.S. Appl. No. 12/591,611, filed Dec. 21, 2006; Veerasamy.
U.S. Appl. No. 12/654,594, filed Mar. 15, 2007; Blacker et al.
U.S. Appl. No. 12/662,077, filed Oct. 26, 2006; Veerasamy.
U.S. Appl. No. 12/801,848, filed Jan. 30, 2009; Veerasamy.
U.S. Appl. No. 12/923,775, filed Jan. 29, 2007; Murphy et al.
U.S. Appl. No. 12/923,778, filed Jan. 29, 2007; Murphy et al.
U.S. Appl. No. 12/929,252, filed Jan. 11, 2011; Veerasamy.
U.S. Appl. No. 12/923,146, filed Sep. 3, 2010; Broadway et al.
U.S. Appl. No. 12/923,838, filed Oct. 8, 2010; Broadway et al.
U.S. Appl. No. 12/929,481, filed Jan. 27, 2011; Broadway et al.
U.S. Appl. No. 12/662,443, filed Apr. 16, 2010; Wang et al.
U.S. Appl. No. 11/412,118, filed Apr. 27, 2006; Veerasamy et al.
U.S. Appl. No. 12/929,740, filed Feb. 11, 2011; Walp.

* cited by examiner

SUBSTRATES OR ASSEMBLIES HAVING DIRECTLY LASER-FUSED FRITS, AND/OR METHOD OF MAKING THE SAME

FIELD OF THE INVENTION

Certain example embodiments of this invention relate to patterned substrates, and/or methods of patterning substrates. More particularly, certain example embodiments of this invention relate to substrates or assemblies having laser-fused fits, and/or methods of making the same. In certain example embodiments, (1) a pattern is formed or written on a stock glass sheet by laser fusing frit material to the glass sheet, (2) an optional thin film coating is disposed on and supported by the stock glass sheet, and (3) the stock glass sheet with the pattern and the optional thin film coating is cut prior to heat treatment (e.g., heat strengthening and/or thermal tempering).

BACKGROUND AND SUMMARY OF EXAMPLE EMBODIMENTS OF THE INVENTION

Ceramic frit patterns currently are applied to interior and exterior glass surfaces using known silkscreen or inkjet processes. These processes typically require the entire glass system to be heated to temperatures above 500 degrees C. to fire the frit into the glass, creating a strong bond. The patterned glass optionally may be coated with a thin film coating over the ceramic frit pattern. The thus patterned and optionally coated glass may be used monolithically or built into an insulated glass (IG) unit. Typically, the surface that is patterned and optionally coated is disposed on the second surface from the sun.

FIG. 1 is a flowchart illustrating a current process for silkscreen printing a pattern on a substrate. As shown in FIG. 1, bulk glass is produced or provided in step S102. This mother substrate is then cut into appropriate sizes in step S104. The silkscreen pattern is then applied to the sized pieces in step S106, and the patterned cut pieces of glass are heat treated (e.g., heat strengthened or thermally tempered) in step S108. The high temperature process used to fire the frit is commonly conducted during the heat treating, although this is not always the case. A separate drying and/or firing process may sometimes be used; however, having separate high temperature processes for firing the frit and for heat treating the patterned substrate may be undesirable from cost perspectives (e.g., in terms of equipment costs), as well as time perspectives (e.g., as delays may be caused by multiple high-temperature heating and subsequent cooling processes). Referring once again to FIG. 1, an optional thin film coating is disposed on the heat treated pieces (e.g., via sputtering or the like) in step S110. The cut, patterned, tempered, and optionally coated pieces may be used monolithically or built into an IG unit in step S112.

The inkjet process involves a similar flow to that described above in connection with FIG. 1.

FIG. 2 is a plan view of a substrate 200 having an example frit pattern 202 formed or written thereon. As is common, the cut, patterned, tempered, and optionally coated pieces may be used in a wide variety of applications including, for example, windows in commercial settings where some light blockage is desirable, vehicle windshields (e.g., at or around the periphery of the windshield), in residential settings, etc.

The heat treatment (e.g., tempering) typically involves quenching. As will be appreciated, the heat treated products cannot be further cut or sized. Thus, in conventional process flows, as indicated above, the cutting must take place before the heat treatment. And to save on high temperature process steps, the frit typically is fired together with the heat treatment as indicated above.

Unfortunately, the current process flow suffers from several inefficiencies and further improvements are desirable. For example, silkscreen and inkjet printing processes are performed on the cut substrates, prior to heat treatment. By contrast, thin film deposition is performed after the heat treatment, e.g., to help ensure the survivability of the coating. The patterning and thin film coating of cut sheets, however, introduces inefficiencies as compared to patterning and coating the large, stock sheets of glass. Yield may be reduced, and patterning and/or coating processes may be complicated by the need to deal with multiple different sizes of cut glass substrates.

Thus, it will be appreciated that there is a need in the art for improved techniques for applying frit patterns to substrates.

Certain example embodiments of this invention relate to a method of making a coated article. A frit material is applied to a glass substrate (e.g., via a suitable wet technique). The frit material is selectively fired via a laser source (e.g., a solid state laser such as a YAG laser) so as to form or write a predetermined pattern, wherein a laser from the laser source directly or indirectly (e.g., through a or the substrate) contacts the frit material. Non-fired frit material is removed from the glass substrate (e.g., via washing). The glass substrate is cut following said removing in making the coated article. The cut coated article may be heat treated in certain example embodiments. In certain example embodiments, a thin film coating may be deposited, directly or indirectly, on the substrate prior to said cutting.

Certain example embodiments of this invention relate to a method of making an insulated glass (IG) unit is provided. A second substrate is positioned in substantially parallel, spaced apart relation to the above-described or other coated article made. A spacer is provided between the coated article and the second substrate. In certain example embodiments, where a thin film coating is provided, the coating may be located on surface 2 of the IG unit.

Certain example embodiments of this invention relate to a heat treatable coated article, comprising: a first glass substrate; a laser-fired frit material formed or written on the substrate in a predetermined pattern; and a heat treatable sputter-, PVD- or CVD-deposited coating formed over the substrate and the laser-fired frit material. The visible light transmission in regions of the coated article with the patterned frit material thereon is less than 25% post heat treatment in certain example embodiments "PVD" refers to physical vapor deposition; and "CVD" refers to chemical vapor deposition). An IC unit incorporating the same or a similar coated article may be provided in certain example embodiments.

Certain example embodiments of this invention relate to a laser heating system. A conveyor system is provided. Laser firing means are provided for laser heating frit material applied to a glass substrate, with the laser firing means including a YAG laser source and being controllable to directly or indirectly (e.g., through a or the substrate) heat the frit material without raising the substrate temperature above 50 degrees C. At least one processor is configured to control the laser firing means so as to form or write a predetermined pattern in the frit material.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to substrates or assemblies having laser-fused frits, and/or methods of making the same. In certain example embodiments, (1) a pattern is formed or written on a stock glass sheet by laser fusing frit material to the glass sheet, (2) an optional thin film coating is disposed on and supported by the stock glass sheet, and (3) the stock glass sheet with the pattern and the optional thin film coating is cut prior to heat treatment (e.g., heat strengthening and/or thermal tempering). The laser fusing technique is fast and need not necessarily heat the entire substrate to the frit firing temperature. In other words, the laser may selectively heat a ceramic frit on the glass, either directly or indirectly. Thus, in certain example embodiments, a laser focused on the surface of the frit may help to fuse it to the glass without having to thermally treat the entire glass system. The glass substrate with the frit pattern thereon may still be in the annealed state and thus may still be cut. The patterned glass may or may not be coated with a thin film coating prior to heat treatment. Large sheets of patterned glass with the coating on the substrate (and possibly over the pattern) may be cut to custom sizes, then heat treated, and used monolithically or in an insulated glass unit.

Figure 1:
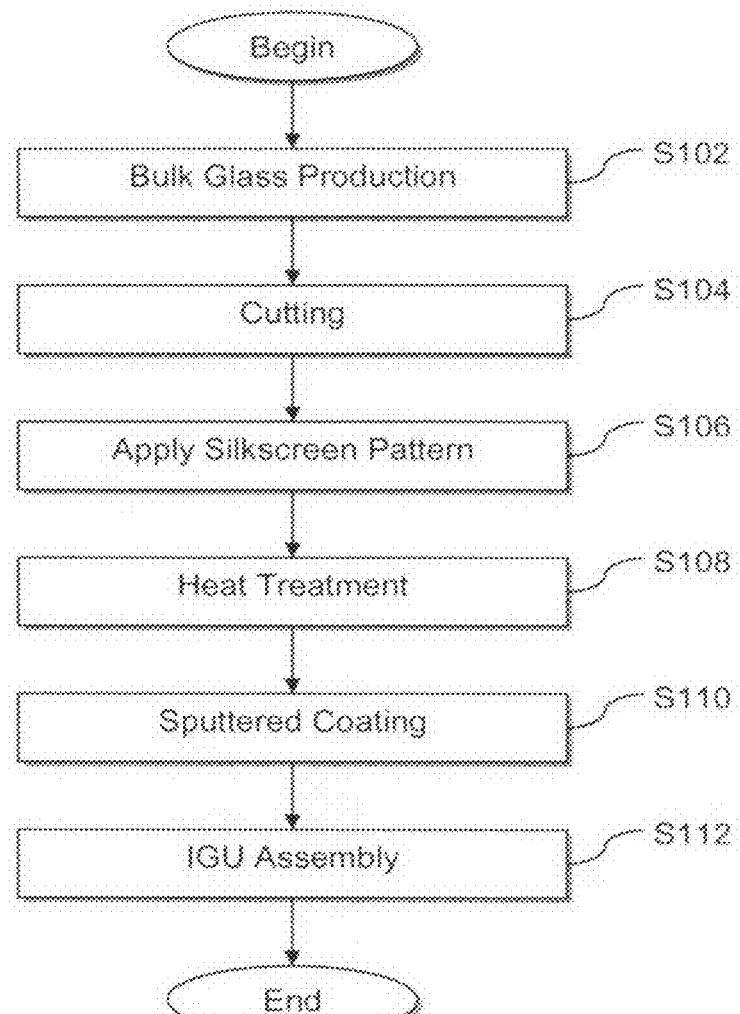
FIG. 1 is a flowchart illustrating a conventional process for silkscreen printing a pattern on a substrate.
Figure 3:
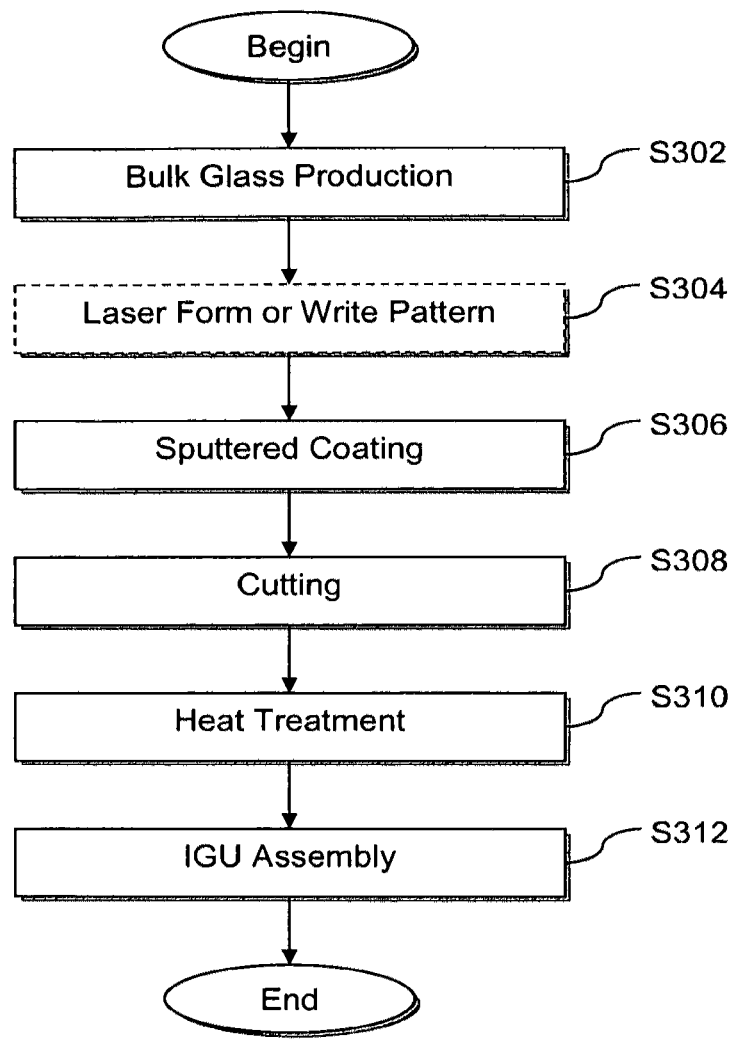
FIG. 3 is a flowchart illustrating an improved process for forming or writing a frit pattern on a substrate in accordance with certain example embodiments.

Referring now more particularly to the drawings in which like numerals indicate like parts throughout the several views, FIG. 3 is a flowchart illustrating an improved process for forming or writing a frit pattern on a substrate in accordance with certain example embodiments. Similar to as shown in FIG. 1, in FIG. 3, bulk glass is produced or provided in step S302. A frit pattern is then formed or written in step S304, example details of which are provided below. In step S306, a thin film coating that is capable of surviving the heat treatment process may be applied over the substrate and over the frit pattern. In certain example embodiments, however, the thin film coating may be disposed over the substrate and the frit pattern may be disposed over the thin film coating. The mother glass substrate may be cut or sized in step S308 and forwarded on for heat treatment (e.g., heat strengthening or tempering) in step S210. The resulting substrates may be used in monolithic applications or, in the alternative, they may be built into IG units in step S312. It will be appreciated that a monolithic article may be forwarded to a different party, e.g., for IG unit fabrication, in certain example embodiments.

Figure 4:
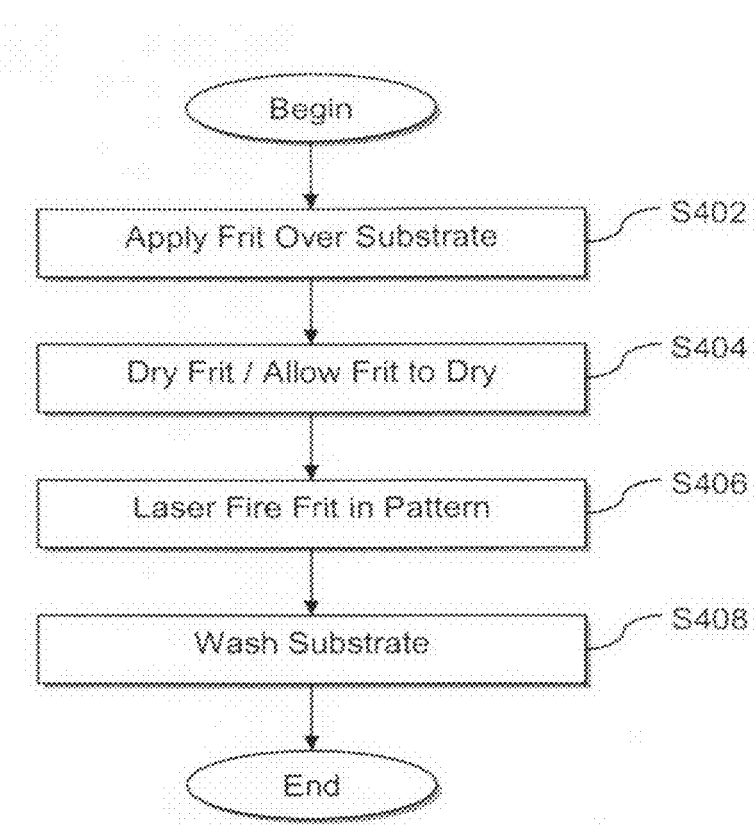
FIG. 4 is a flowchart illustrating an example laser firing process in accordance with certain example embodiments.

FIG. 4 is a flowchart illustrating an example laser firing process in accordance with certain example embodiments. As shown in FIG. 4, in step S402, frit material is applied over the substrate. The frit may be applied to the substrate by any suitable means including wet techniques such as, for example, curtain coating, roll coating, spin coating, coating via a Mayer rod, etc. The frit material may be applied to the entire, substantially the entire, or only portions of the substrate, depending on the desired end product. Masks optionally may be used to help control where the frit material is applied.

The frit material may be applied to a suitable thickness such that a desired opacity or transparency is obtained at the end of the process. It will be appreciated that the relationships between the thickness initially put down, the final thickness, opacity/transparency, etc., may vary based on the frit material. Example frit materials that are usable in connection with certain embodiments of this invention include the LMC98 frit commercially available from TherMark, CerMark type frits, frits produced by Ferro, etc. A final thickness of 50-100 microns, more preferably 60-90 microns, and sometime around 77 microns is suitable for the LMC98 frit for various commercial applications.

The frit material, once applied, may be dried or allowed to dry in step S404. Many frit materials will dry in about 10 minutes at room temperature. However, if faster dry times are desired, heat may be applied. For instance, a temperature of 250-450 degrees F., more preferably 300-400 degrees F., and sometimes around 356 degrees F. may help speed the drying process.

The frit material may be laser fired in step S406 so as to help ensure that it is fused, welded, or otherwise attached to the glass substrate. Any suitable laser may be used in certain example embodiments. It has been observed, however, that solid state (e.g., YAG) lasers are particularly advantageous as compared to other types of lasers (including, for example, $CO_2$ lasers). A 20 watt YAG laser at 100% power may be used. When a YAG laser is used, a wavelength of between about 1.03-2.0 microns may be used. In certain example embodiments, a 1064 nm wavelength operating at a frequency of 100 kHz may be used. The YAG laser wavelength has been found to be advantageous in certain example implementations, e.g., compared to $CO_2$ lasers, as YAG lasers have been found to provide better consistency and $CO_2$ lasers have been observed as operating at wavelengths that damage the underlying glass substrate. A linear speed of 40"/second is possible using a 20 watt YAG laser operating at 100% power. However, it is possible to move to a higher wattage lasers (e.g., a 50 watt laser, etc.) in different embodiments, e.g., to increase speed.

A strike distance of 1/1000th of an inch is possible using a YAG laser and has been found to provide the desired opacity. The pattern may be predetermined and stored to a non-transitory computer storage medium, readable by at least one processor of a laser control system. The laser may be controlled via the control system so as to create the predetermined pattern.

If the frit is water soluble, the excess material (e.g., where the frit is not fused by virtue of laser exposure) may be washed off in step S408. Mechanical brushing or other means may be provided in addition or in the alternative in different embodiments of this invention.

Figure 5:
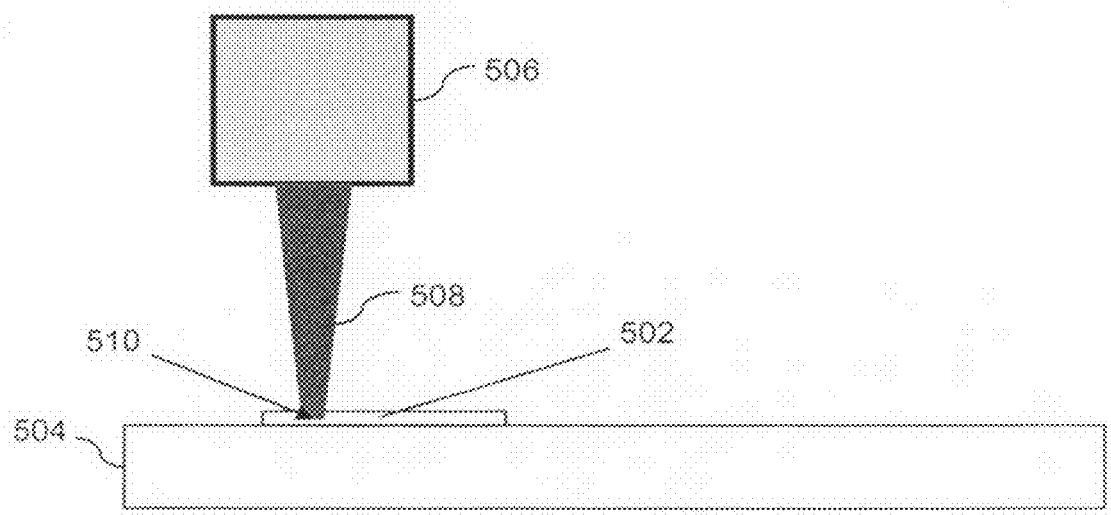
FIG. 5 is a schematic view of a laser directly heating frit material in forming or writing a pattern in accordance with certain example embodiments.
Figure 6:
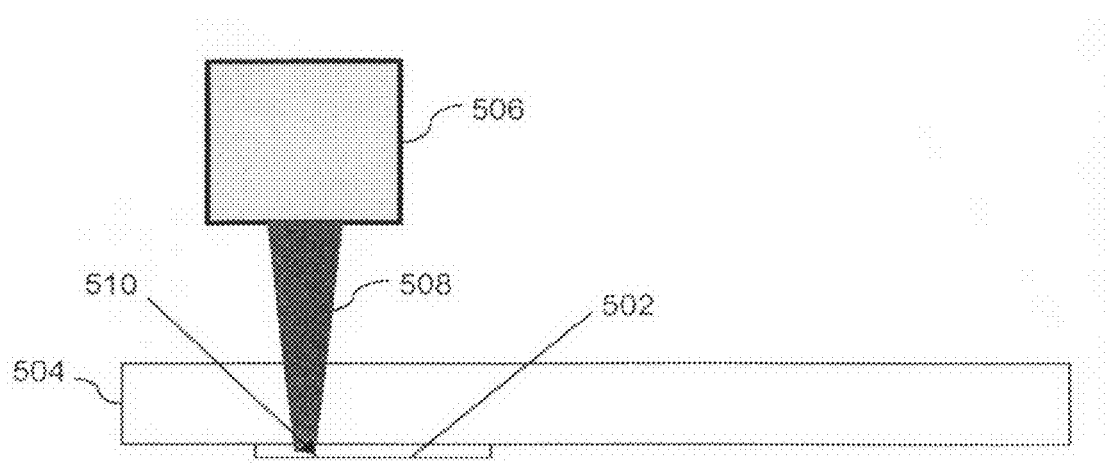
FIG. 6 is a schematic view of a laser indirectly heating frit material in forming or writing a pattern in accordance with certain example embodiments.

FIG. 5 is a schematic view of a laser directly heating frit material in forming or writing a pattern in accordance with certain example embodiments, and FIG. 6 is a schematic view of a laser indirectly heating frit material in forming or writing a pattern in accordance with certain example embodiments. The coated frit material 502 is supported by the glass substrate 504. The laser source 506 emits a laser 508 where the frit material is to be patterned, creating a selective laser heating area 510. FIGS. 5 and 6 are similar to one another, except that the laser directly laser heats the frit 502 in FIG. 5 and indirectly laser heats the frit 502 in FIG. 6. That is, in the FIG. 5 example, the laser source 506 and the laser 508 are provided on the same side of the substrate 504 as the frit 502. By contrast, in the FIG. 6 example, the laser source 506 is provided on a side of the substrate 504 opposite to the frit 502, and the laser 508 extends through the substrate 504.

In one or both arrangements, there is no intentional heating of the substrate. Rather, the frit itself is heated to a suitable firing temperature (e.g., typically around 650 degrees C. for many commercially available frits). The fits of certain example embodiments may be heated up to the glass softening point, e.g., up to about 725 degrees C. depending on the type of underlying substrate used, in certain example embodiments of this invention. With the direct laser heating method in FIG. 5, the glass temperature is raised to a temperature less than 50 degrees C. The indirect laser heating method of FIG. 6 may raise the glass temperature somewhat higher than in the FIG. 5 example; however, the temperature of the glass preferably remains less than 100 degrees C. and likely somewhere in the 50-100 degree C. range. In both cases, however, the glass can be safely handled by humans immediately after the laser heating.

It surprisingly and unexpectedly has been found that indirect heating methods such as those shown in FIG. 6 provide better results than those in FIG. 5. For instance, it has been found that the indirect heating in FIG. 6 enables a lower opacity to be obtained. One example direct laser heating application provided 25-30% visible transmission, whereas one example indirect laser heating application provided 19% visible transmission.

The resolution is "sharper," e.g., as measured at the edges of the pattern. It is believed that the direct heating techniques of FIG. 5 involve patterning a more three-dimensional surface, whereas the indirect heating techniques of FIG. 6 provide a more two-dimensional or planar surface to be patterned, e.g., because the interface between glass surface and the frit is very smooth.

Although the laser sources are shown "above" the frit in the FIG. 5 and FIG. 6 examples, different arrangements are possible. For example, for direct laser heating embodiments, the laser source may be located below a conveyor on which the substrate travels, provided that the frit-side is facing downward. The laser from the laser source may fire the frit according to the pattern via a window or gaps between the rollers. A number of different arrangements also are possible for indirect laser heating embodiments. For instance, the laser source may be provided below a conveyor, with the coating side up, and with the laser being aimed between the rollers or through a gap or window. As another example arrangement for indirect laser heating, the laser source may be provided above the substrate with the frit side facing down (e.g., towards the rollers). An optional removable glass or other substrate may be provided between the rollers and the frit material. This protective sheet may be removed prior to washing, etc.

It will be appreciated that two or more lasers may be used in certain example embodiments. The two or more lasers may be provided on a common side of the substrate, e.g., so that each of the lasers directly heats or indirectly heats the frit material. However, in certain example embodiments, two or more lasers may be provided, with at least one laser provided on a first side of the substrate and with at least one laser provided on the opposite side of the substrate. Thus, certain example embodiments may allow for simultaneous laser heating from above and below. Such simultaneous laser heating from above and below may in certain example instances be focused on the same areas or on different areas, e.g., potentially allowing for both direct and/or indirect heating at the same time on the same or different areas.

Figure 7:
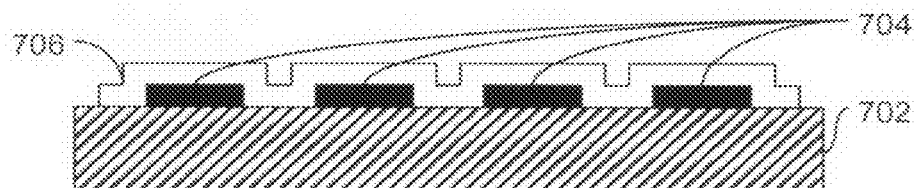
FIG. 7 is an illustrative coated article including a laser fused frit pattern in accordance with certain example embodiments.

FIG. 7 is an illustrative coated article including a laser fused frit pattern in accordance with certain example embodiments. FIG. 7 shows a substrate 702 supporting a frit 704 that has been laser patterned. A thin-film coating 706 is provided over the substrate 702 and the patterned frit 704. Although a single layer 706 is shown, it will be appreciated that single layer or multi-layer coatings may be provided. Such coatings may be sputter deposited, PVD deposited, CVD deposited, etc., and such coatings may be capable of surviving high temperatures in the event that they are disposed before heat treatment. Of course, such layers also may be disposed after heat treatment in certain example embodiments. In certain example embodiments, the coatings may serve low-E, protective/durable, antimicrobial, anticondensation, antireflective, and/or other features. For example, the coating 706 may be a SunGuard low-E coating, a DiamondGuard protective coating, a ClimaGuard coating, a ShowerGuard coating, etc., e.g., as known and provided by the assignee of the instant invention.

Example low-E and/or anticondensation coatings are described in, for example, application Ser. No. 12/926,714 (now U.S. Pat. No. 8,524,337); Ser. Nos. 12/923,082; 12/662,894 (now U.S. Pat. No. 8,304,045); Ser. Nos. 12/659,196; 12/385,234 (now U.S. Pat. No. 7,858,191); Ser. Nos. 12/385,802; 12/461,792 (now U.S. Pat. No. 8,017,243); Ser. No. 12/591,611 (now U.S. Pat. No. 8,197,941); and Ser. No. 12/654,594, the entire contents of which are hereby incorporated herein by reference. For example, FIG. 7 of U.S. Pat. No. 8,524,337 illustrates a multilayer coating including an ITO layer located between respective layers comprising silicon oxynitride. As another example, FIGS. 1 and 7 of U.S. Pat. No. 7,858,191 illustrate a silver-based low-E coating, where the low-E coating includes a silver inclusive IR reflecting layer located between at least dielectric layers. Example protective coatings are described in, for example, application Ser. No. 12/662,077 (now U.S. Pat. No. 7,892,604); Ser. No. 12/801,848 (now U.S. Pat. No. 8,277,946); Ser. Nos. 12/923,775; 12/923,778; and Ser. No. 12/929,252, the entire contents of which are hereby incorporated herein by reference. Example three-layer AR coatings also are disclosed in co-pending and commonly assigned application Ser. Nos. 12/923,146 and 12/923,838, the entire contents of which are hereby incorporated herein by reference. Example four-layer AR coatings also are disclosed in co-pending and commonly assigned application Ser. No. 12/929,481 (filed on Jan. 27, 2011 and entitled "HEAT TREATABLE FOUR LAYER ANTI-REFLECTION COATING"), which also is incorporated herein by reference. Example anti-bacterial and/or anti-fungal coatings are described in, for example, application Ser. Nos. 12/662,443 and 11/412,118 (now U.S.

Pat. No. 7,892,662), the entire contents of which are hereby incorporated herein by reference.

Figure 8:
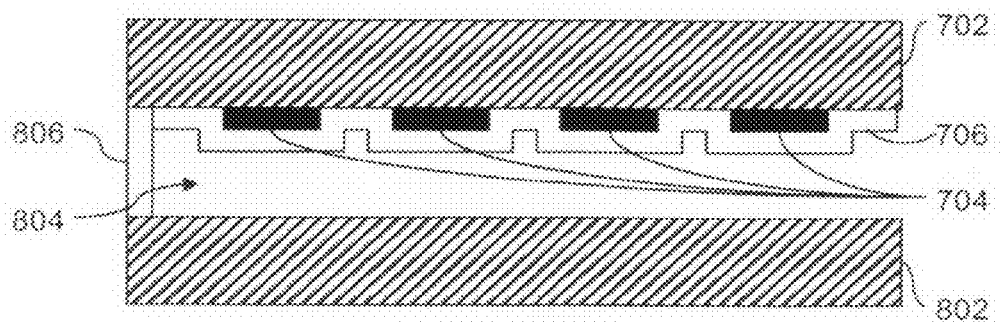
FIG. 8 is an illustrative insulated glass (IG) unit having an illustrative coated article including a laser fused frit pattern in accordance with certain example embodiments.

The FIG. 7 example may be suitable for monolithic applications. However, the FIG. 7 example coated article may be built into an IG unit in certain example instance. In that regard, FIG. 8 is an illustrative insulated glass (IG) unit having an illustrative coated article including a laser fused frit pattern in accordance with certain example embodiments. The FIG. 7 example coated article is spaced apart from a second substrate 802, and a gap 804 is formed therebetween. A spacer 806 is provided at the periphery of the substrates and helps to maintain the first and second substrates 702 and 802 in substantially parallel, spaced apart relation to one another.

The coating 706 is shown on surface 2 of the IG unit (e.g., on an inner surface facing the gap 804 of the outer substrate 702 that is nearest the sun). Additional thin film coatings may be provided, for example, on other surfaces of the IG unit in different example embodiments.

It will be appreciated that the example coated article shown in FIG. 7 also may be used in vacuum insulated glass (VIG) units in certain example embodiments of this invention.

Although the end applications vary, typical silkscreen printing provides 15-20% visible transmission in the regions of frit application. Overall visible light transmission may depend at least in part on the percent area the frit covers. The techniques disclosed herein may be capable of meeting or approximating this range.

Figure 2:
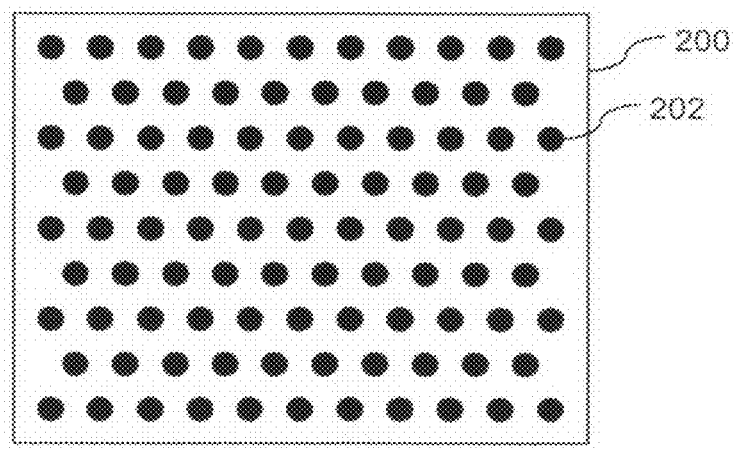
FIG. 2 is a plan view of a substrate having an example frit pattern formed or written thereon.

It will be appreciated that the techniques described herein may be used to produce coated articles suitable for a wide variety of applications including, for example, windows in commercial settings where some light blockage is desirable, vehicle windshields (e.g., at or around the periphery of the windshield), in residential settings, etc. Although an example pattern and an example shape for individual fired frit elements are shown in FIG. 2 (e.g., as a "dot pattern"), other patterns, shapes, sizes, etc., may be used in different embodiments of this invention. The example frit materials described herein at least initially are white but are fired to darker or more opaque colors. However, different embodiments may involve frit materials with different starting and/or ending colors.

Although certain example embodiments have been described in connection with glass substrates, the techniques described herein may apply with respect to substrates made of other materials. Thus, while the glass substrates of certain example embodiments may be borosilicate glass, soda lima glass, or other forms of glass, other substrates such as plastic substrates, polymer substrates, etc., may benefit from the example techniques described herein.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a coated article, the method comprising:
   applying a frit material to a glass substrate;
   selectively firing the frit material via a laser beam from a laser source so as to form or write a predetermined pattern comprising an array of spaced apart dots, wherein the laser beam impinges upon the frit material and does not pass through any glass substrate between the laser source and the frit material;
   removing non-fired frit material from the glass substrate so that the glass substrate with the pattern thereon has a visible transmission of from 15-20% in a region where the pattern is formed;
   sputter-depositing a multi-layer coating on the glass substrate over and contacting the glass substrate and at least part of the fired frit material, so that the fired frit material is located between the glass substrate and the multi-layer coating, said multi-layer coating directly contacting both the glass substrate and the fired frit material and comprising at least a layer comprising indium-tin-oxide (ITO) located between first and second dielectric layers, each of the dielectric layers comprising silicon oxynitride; and
   cutting the glass substrate following said removing in making the coated article.

2. The method of claim 1, further comprising heat treating the cut coated article.

3. The method of claim 1, wherein the multi-layer coating is sputter-deposited prior to said cutting.

4. The method of claim 1, wherein the laser source is a YAG laser source.

5. The method of claim 4, wherein the YAG laser source operates at a wavelength of 1064 nm.

6. The method of claim 5, wherein the YAG laser source operates at a frequency of 100 kHz.

7. The method of claim 1, wherein the frit material is wet-applied to the substrate.

8. The method of claim 1, wherein the non-fired frit material is removed from the glass substrate via washing.

9. The method of claim 7, further comprising drying the frit material and/or allowing the frit material to dry prior to said selective firing.

10. A method of making a coated article, the method comprising:
    applying a frit material to a glass substrate;
    selectively firing the frit material via a laser beam from a laser source so as to form or write a predetermined pattern comprising an array of spaced apart dots, wherein the laser beam impinges upon the frit material and does not pass through any glass substrate between the laser source and the frit material;
    removing non-fired frit material from the glass substrate so that the glass substrate with the pattern thereon has a visible transmission of from 15-20% in a region where the pattern is formed;
    sputter-depositing a multi-layer low-E coating, comprising an IR reflecting layer comprising silver, on the glass substrate over and contacting the glass substrate and at least part of the fired frit material, so that the fired frit material is located between the glass substrate and the multi-layer low-E coating, said multi-layer coating directly contacting both the glass substrate and the fired frit material; and
    cutting the glass substrate following said removing in making the coated article.

* * * * *